United States Patent
Honma et al.

[11] 3,855,874
[45] Dec. 24, 1974

[54] DOUBLE MESH TYPE W-N GEAR

[75] Inventors: Seishi Honma, Yokohama;
Yoshihisa Fujii, Tokyo, both of Japan

[73] Assignee: Kabushiki Kaisha Hasegawa Haguruma, Tokyo, Japan

[22] Filed: July 12, 1973

[21] Appl. No.: 378,786

[30] Foreign Application Priority Data
July 26, 1972   Japan................................ 47-74210

[52] U.S. Cl. ................................................. 74/462
[51] Int. Cl. ............................................. F16h 55/06
[58] Field of Search ............................ 74/462, 457

[56] References Cited
UNITED STATES PATENTS
3,709,055   1/1973   Grove ................................... 74/462
3,756,091   9/1973   Miller ................................ 74/462 X

*Primary Examiner*—Leonard H. Gerin
*Attorney, Agent, or Firm*—Oldham & Oldham Co.

[57]   ABSTRACT

So-called "initial pitting" conventionally unavoidable with some sorts of this type of gears can be effectively prevented by increasing the clearance between the intermediate portions of the mating tooth surfaces and this can be attained by shifting the two points of meshing contact from their normal position respectively in a direction away from the pitch line or by arranging the meshing gears at a center distance slightly smaller than normal. Among additional advantanges are: reduced contamination of lubricating oil, smoother operation and increase in durability.

7 Claims, 7 Drawing Figures

DOUBLE MESH TYPE W-N GEAR

BACKGROUND AND SUMMARY OF THE INVENTION

This invention relates to improvements in or relating to so-called W-N (Wildhaver-Novikov) gears of the double mesh type. The standard tooth profile of basic rack of this type of gears includes circular addendum and dedendum arcs and a straight line portion with which the circular arcs merge smoothly and such gears are of the so-called point contact type, the addendum and dedendum arcs being different from each other in radius of curvature.

W-N gears of the double mesh type generally excel gears of other types including involute gears in load-carrying capacity, but are liable to so-called "initial pitting," which is obviously undesirable from the standpoint of service life and lubrication.

In view of the above, the present invention has for its object the provision of a double mesh type W-N gear or a pair of such gears in which the clearance obtainable between the intermediate straight line portions of the mating tooth surfaces is increased effectively to prevent any "initial pitting" from occurring in such region.

According to one aspect of the present invention, the clearance between the straight line portions of basic rack of the mating tooth surfaces or the spacing obtainable between the mating tooth surfaces in the vicinity of the pitch line, is effectively increased by modifying the tooth profile in a manner so that the two points of meshing contact are each shifted in a direction away from the pitch line to give a pressure angle of not less than 30°.

According to another aspect of the present invention, the clearance between the straight line portions of basic rack of the mating tooth surfaces is effectively increased with use of the standard tooth profile by appropriately reducing the center distance of the meshing gears below the normal center distance.

The above and other objects, features and advantages of the present invention will become apparent from the following description when taken in conjunction with the accompanying drawings.

DESCRIPTION OF THE PREFERRED EMBODIMENTS

For a clear understanding of the present invention, description will first be made of the standard tooth profile of W-N gears of the type concerned, with reference to FIGS. 1 and 2.

Figure 1:
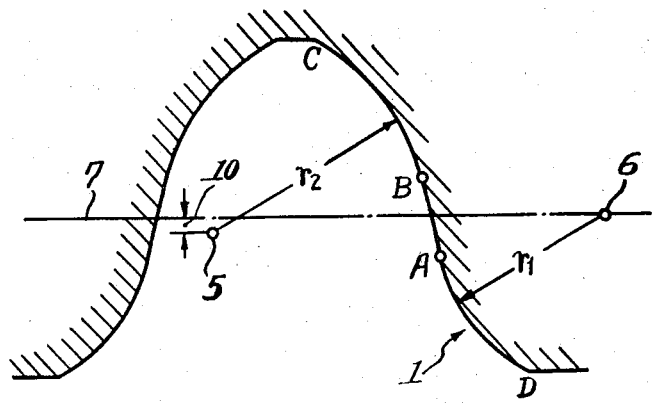
FIG. 1 is a diagram showing the standard tooth profile of a double mesh type W-N gear.

As shown in the diagram of FIG. 1, the standard tooth profile of basic rack of double mesh W-N gears includes circular addendum and dedendum arcs AD and BC merging smoothly into an intermediate straight line segment AB and from each other in radius of curvature having respective radii of curvature $r_1$ and $r_2$, which are different from each other.

Figure 2:
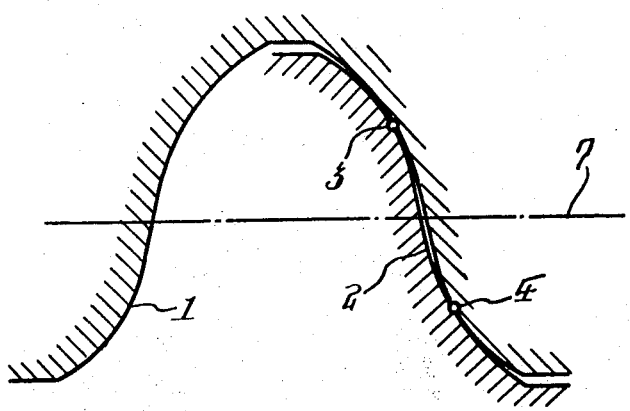
FIG. 2 is a diagram showing the manner in which two W-N gears of the standard tooth profile of FIG. 1 mesh with each other.

W-N gears defined in the manner described above are gears of the so-called point contact type and, as observed from FIG. 2, two meshing teeth 1 and 2 of such gears are placed in contacting engagement with each other solely at two points of contact 3 and 4; in other words, either of the meshing gear teeth 1 and 2 engages at a point substantially in the middle of its addendum are with the other gear tooth at a point substantially in the middle of the dedendum are of the latter. Accordingly, with such gears, the tooth configuration itself cannot serve to give any constant speed ratio and for realization of such speed ratio resort must be had to some form of progressive contact obtainable across the tooth surface. In practice, therefore, gears of this type are employed only in the form of helical gears of a tooth width exceeding a certain minimum and the two points of contact 3 and 4 each describe a straight line parallel to the pitch line. It is for this reason that gears of the tooth profile shown in FIG. 1 are commonly called double mesh type W-N gears.

As will readily be understood, gears of this type generally exhibit a substantial resistance to pitting, i.e., exfoliation of tooth material or cratering in the tooth surface, which is approximately two or three times as high as that of involute or other types of gear. Further, in the case of double mesh type W-N gears, meshing contact takes place between a convex surface and a concave surface, but not between convex surfaces as in the case of involute gears and this accounts for substantial reduction in Hertzian stress and increase in load-carrying capacity. On the other hand, double mesh type W-N gears have previously involved the disadvantage that they are liable to pitting in the initial period of service, that is, immediately after they have been put into operation for the first time under actual load. As typically illustrated in FIG. 6 at $q$, such pitting usually occurs in the vicinity of the pitch line in a pattern of linear distribution along the whole width of the gear teeth and is a kind of so-called "initial pitting," which slows down as the gear teeth get to fit each other and does not impair the durability itself of the gears to any substantial extent. Such phenomenon, however, is not only undesirable in nature but causes lubrication problems as particles of tooth material dislodged contaminate the lubricating oil, affording deleterious effects upon the tooth surfaces, bearings and other parts of the system.

The reason for such initial pitting occurring in the vicinity of the pitch line of conventional double mesh W-N gears can possibly be explained as follows. Seeing the geometrical configuration of the gear teeth, any double meshing teeth should theoretically make contact with each other only at two points 3 and 4, leaving some clearance between the mating tooth surfaces in the vicinity of the pitch line, as shown in FIG. 2. In actual loaded condition, however, double meshing gear teeth are shifted from their normal theoretical position away from each other on account of a number of factors, including deflection of the teeth themselves and the gear shafts, radial clearance and deflection of the shaft bearings and the plus tolerance on distance between the gear axes. As the consequence, the points of contact indicated at 3, 4 in FIG. 2 are shifted toward the pitch line 7 and load is concentrated in the area adjacent to the pitch line, i.e., in the vicinity of the straight portion of the tooth profile of basic rack. Moreover, in this area, the tooth profile is in effect of involute form and contact is made between convex surfaces, causing high local stresses therein. This naturally gives an account for the start and progress of "initial pitting" in the tooth surfaces.

On the other hand, in the manufacture of gear cutting tools, it is difficult to make the arcuate portions of the tool surface merge smoothly with the straight portion thereof and ridges are liable to be formed along the line of merger between the arcuate and straight portions. As will be apparent, use of gear cutting tools formed with such ridges results in gears with corresponding ridges formed thereon and, with such gears, initial pitting will take place also along such ridges.

Under these circumstances, the present invention proposes to increase the clearance between the involute portions of the mating surfaces of two gear teeth in mesh thereby to effectively prevent and "initial pitting" in the tooth surfaces.

Figure 3:
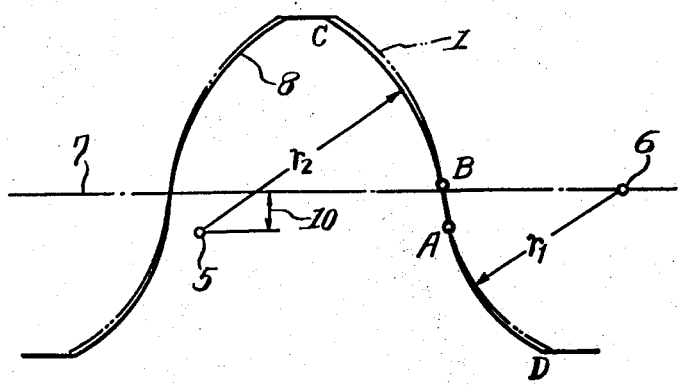
FIG. 3 is a diagram illustrating the tooth profile of a double mesh type W-N gear modified according to the present invention.

One preferred embodiment of the invention is diagrammatically illustrated in FIG. 3 by solid lines as a modification of the standard tooth form 1 shown in FIGS. 1 and 2. The modified tooth profile 8 is basically similar to the standard form 1 in that it is constituted of circular arcs AD and BC and a straight line segment AB and there is no need of changing the ratio of the radius of curvature, $r_1$, of arc AD to that, $r_2$, of arc BC to any substantial extent, but in the modified profile the distance 10 of the center 5 of the arc BC from the pitch line 7 is made larger than that in the standard profile 1. In other words, the distance 10 in the modified tooth profile 8 is made 0.1 module or over in contrast to that in the standard profile of approximately 0.06 module. In FIG. 1, the dotted lines 1 represent a standard tooth profile of the same module as that of the modified profile 8.

Figure 4:
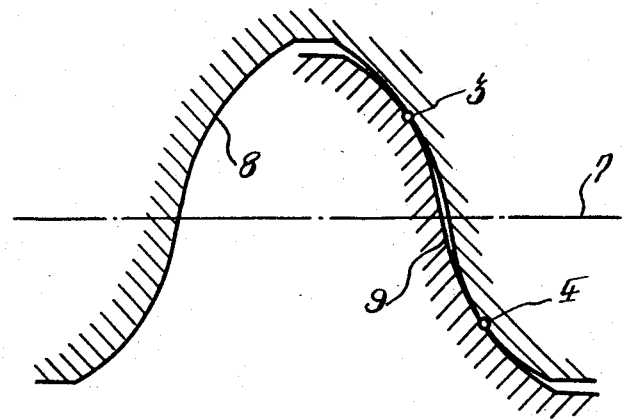
FIG. 4 is a diagram similar to FIG. 2, showing the manner in which two W-N gears of the modified tooth profile mesh with each other.

FIG. 4 illustrates the manner in which two gear teeth 8 and 9 of the profile modified as described above mesh each other. In the case of the standard tooth profile, the points of contact 3 and 4 between two mating tooth surfaces lie substantially in the middle of respective circular arcs BC and AD, giving a pressure angle of less than 30°, as observed in FIGS. 1 and 2. In contrast to this, in the case of the tooth profile modified according to the present invention, the points of contact 3 and 4 are shifted away from each other toward the top and bottom of the meshing gear teeth, giving a pressure angle of 30° or over, as illustrated in FIG. 4. As the result, the clearance between the mating tooth surfaces in the vicinity of the pitch line 7 is increased to a substantial extent relative to that conventionally obtained. It will be appreciated, therefore, that, with the modified tooth profile, even if the points of contact 3 and 4 are shifted toward the pitch line 7 under loaded condition due to deflection of the associated parts or clearance therein, there still remains a substantial clearance in the vicinity of the pitch line, that is, between the involute portions of the mating tooth surfaces and thus occurrence of any initial pitting in this area is effectively prevented to realize an ideal state of driving contact between the double meshing W-N gears.

Figure 5:
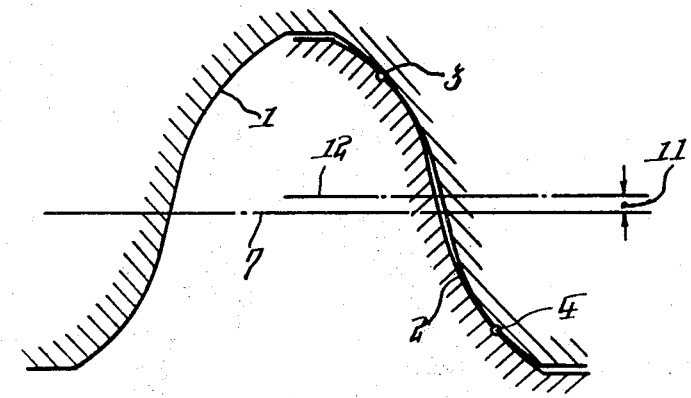
FIG. 5 is a diagram similar to FIGS. 2 and 4, illustrating the meshing engagement of a pair of W-N gears of the standard tooth profile arranged according to the present invention with a center distance reduced below normal.

Another embodiment of the present invention is diagrammatically illustrated in FIG. 5. While in the embodiment of FIGS. 3 and 4 the meshing gears are held at the normal center distance with the pitch lines 7 of the meshing teeth 8 and 9 coinciding with each other, they are arranged in the embodiment of FIG. 5 at a center distance 0.015 to 0.06 module smaller than the normal center distance according to the present invention, though they are of the same tooth profile as that shown in FIG. 2 at 1 or 2. In other words, the pitch lines 7 and 12 of the respective gear teeth 1 and 2 are spaced apart from each other, according to the present invention, by a distance of 0.015 to 0.06 module so that the points of contact 3 and 4 are shifted away from each other toward the top and bottom of the mating tooth surfaces, giving a pressure angle of 30° or over. In this manner, the clearance between the mating tooth surfaces in the vicinity of the pitch lines 7 and 12 is increased and occurrence of any initial pitting is effectively prevented, as with case of the embodiment shown in FIGS. 3 and 4.

Figure 6:
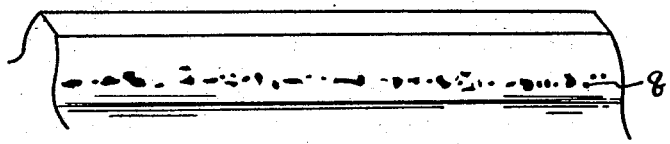
FIG. 6 is a photographic sketch of one tooth of an ordinary double mesh type W-N gear, taken after it has been tested under loaded condition.
Figure 7:
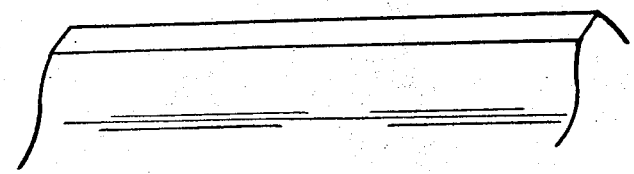
FIG. 7 is a sketch similar to FIG. 6, of one tooth of a double mesh type W-N gear embodying the present invention, taken after it has been tested under loaded condition and showing how the initial pitting has been effectively avoided.

It will be apparent from the foregoing that double mesh type W-N gears designed according to the present invention are free from any initial pitting and thus capable of exhibiting its load-carrying capacity, excelling that of involute gears, to a full extent. Such advantageous features of the present invention have been confirmed experimentally. The photographic sketch of FIG. 7 illustrates one of the results obtained in the experiments. As observed in this figure, any initial pitting such as shown in FIG. 6 has not occurred in the vicinity of the pitch point though the tooth surface has naturally been subjected to some wear in the vicinity of the two points of meshing contact.

From the foregoing it is seen that a novel and improved double mesh type W-N gear device has been provided in various forms and that the objects of the invention have been achieved.

What is claimed is:

1. A double mesh type W-N gear with a basic rack on a transverse plane or on a normal plane characterized in that modifications are introduced so that the two points of contact between the mating tooth surfaces are shifted respectively in a direction away from the pitch line so as to give a pressure angle of not less than 30° thereby to obtain an increased clearance between intermediate straight portions of the mating profiles, the gear teeth profiles each including circular addendum and dedendum arcs connected by an intermediate straight line segment at the pitch line area, the arcs being of different radii centered on the pitch line or on points adjacent thereto, the two points of contact on one gear tooth being one on the addendum and one on the dedendum arc for contact with a gear tooth on the other gear.

2. A double mesh type W-N gear as claimed in claim 1, having a tooth profile modified by spacing the center of the circular dedendum arc (BC) from the pitch line by a distance of not less than 0.1 module.

3. In a double mesh type W-N gear as in claim 1 where the gear teeth profiles each include said circular addendum and dedendum arcs that merge smoothly into the intermediate straight line segment, the center of the circular dedendum arc being spaced from the pitch line by a distance of not less than 0.1 module.

4. In a double mesh type W-N gear as in claim 3 where the circular addendum arc is centered on the pitch line.

5. A gear device including a pair of double mesh type W-N gears, characterized in that the two gears are held in mesh with each other at a center distance slightly smaller than the normal center distance so that the two points of contact between the mating tooth surfaces are shifted from their normal position respectively in a direction away from the pitch line.

6. In a double mesh type W-N gear as in claim 5 where the gear teeth profiles each include circular addendum and dedendum arcs that merge smoothly into an intermediate straight line segment, the arcs having radii of curvature different from each other, the pitch lines of the gear teeth of the two gears being spaced from each other by a distance of 0.015 to 0.06 module to provide increased tooth clearance between mating tooth surfaces in the vicinity of the pitch lines.

7. In a double mesh type W-N gear as in claim 6 where the mating tooth surfaces at the contact point have a pressure angle of at least 30°.

* * * * *